United States Patent
Berning et al.

(10) Patent No.: US 8,118,316 B2
(45) Date of Patent: Feb. 21, 2012

(54) OPERATIONAL METHODS FOR A ROAD-BUILDING MACHINE

(75) Inventors: Christian Berning, Zulpich (DE); Dieter Simons, Buchholz (DE); Markus Schafer, Niederkassel (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 12/911,301

(22) Filed: Oct. 25, 2010

(65) Prior Publication Data
US 2011/0163511 A1 Jul. 7, 2011

Related U.S. Application Data

(63) Continuation of application No. 11/885,460, filed as application No. PCT/EP2006/002151 on Mar. 9, 2006, now Pat. No. 7,828,309.

(30) Foreign Application Priority Data

Mar. 10, 2005 (DE) ........................ 102005011052 U (51) Int. Cl.
*B60S 9/12* (2006.01)
(52) U.S. Cl. .................................................. 280/6.155
(58) Field of Classification Search .............. 280/5.506, 280/5.507, 5.508, 6.154, 6.155, 124.106, 280/124.157, 124.158, 124.159, 124.16, 280/124.161
See application file for complete search history.

(56) References Cited

U.S. PATENT DOCUMENTS

| | | | |
|---|---|---|---|
| 2,926,023 A | 2/1960 | Kraus | |
| 3,477,733 A * | 11/1969 | Gottschalk | 280/124.161 |
| 3,895,820 A | 7/1975 | Takahashi et al. | |
| 4,247,126 A | 1/1981 | Claxton | |
| 5,046,008 A * | 9/1991 | Dieter | 701/38 |
| 5,269,556 A | 12/1993 | Heyring | |
| 6,517,094 B1 * | 2/2003 | Kincaid et al. | 280/124.106 |
| 6,669,216 B1 | 12/2003 | Elser et al. | |
| 7,055,832 B2 | 6/2006 | Germain | |

FOREIGN PATENT DOCUMENTS

| | | |
|---|---|---|
| AT | 272115 B | 6/1969 |
| DE | 1963704 U | 7/1967 |
| DE | 2844413 A1 | 4/1980 |
| EP | 0940274 A2 | 9/1999 |
| EP | 0836659 B2 | 3/2005 |
| FR | 2161017 | 7/1973 |
| JP | 2005053377 A | 3/2005 |
| WO | 9742377 A1 | 11/1997 |

* cited by examiner

*Primary Examiner* — Paul N Dickson
*Assistant Examiner* — Robert A Coker
(74) *Attorney, Agent, or Firm* — Waddey & Patterson, P.C.; Lucian Wayne Beavers (57) ABSTRACT

A method of operating a road-building machine involves a machine having a chassis with four ground engaging supports and four working cylinders connecting the ground engaging supports to the chassis. A height of the left front and right rear ground engaging supports is adjusted in a first direction. The height of the right front and left rear ground engaging supports is adjusted in a second direction opposite the first direction.

20 Claims, 9 Drawing Sheets

| Track | 1700 mm |
| Wheel base | 6200 mm |
| Milling width | 2000 mm |

| | Floating axle front |||||||||||
|---|---|---|---|---|---|---|---|---|---|---|---|
| | front left | front right | rear right | rear left | front center | rear center | left center | right center | machine center | roller left | roller right |
| Unevenness | 0 | 200 | 0 | 0 | | | | | | | |
| Overall height | 100 | 100 | 0 | 0 | 100 | 0 | 50 | 50 | 50 | 50 | 50 |
| Cylinder | 100 | -100 | 0 | 0 | | | | | | | |

Transverse [%]   0.00
Longitudinal [%]   1.61

OPERATIONAL METHODS FOR A ROAD-BUILDING MACHINE

This application is a continuation of U.S. patent application Ser. No. 11/885,460 which is a U.S. National stage of PCT/EP2006/002151 filed Mar. 9, 2006, which claims priority based upon German application DE 10 2005 011 052.5 filed on Mar. 10, 2005.

The present invention relates to a road-building machine, in particular a road-milling machine, a recycler or a stabilizer, of which the left front wheel or caterpillar, right front wheel or caterpillar, left rear wheel or caterpillar and right rear wheel or caterpillar is adjustable in height by means of an actuating member.

When a road-building machine of this type travels over an obstacle, for example with only one front wheel, this one front wheel is raised by the amount of the height of the obstacle, while the other front wheel remains on the road. The road-building machine is consequently set obliquely, with the result that the milling roller of the road-milling machine or the milling/mixing rotor of the recycler or of the stabilizer is also set obliquely. This effect has an especially disruptive effect particularly when the track of the machine is relatively low in relation to the wheel base.

Various machines are known from the prior art which must react with a suitable way to unevenness in the ground on which these machines move, so that the stability of the machines is not at risk.

U.S. Pat. No. 4,247,126 describes an agricultural machine, in which two front wheels and two rear wheels are provided. Each individual wheel can be adjusted in height, a working cylinder being provided on each wheel for this purpose. The working cylinders are partially connected to one another by corresponding lines, a hydraulic control system being provided which is designed such that either the front and the rear wheel on the left side or the front and the rear wheel on the right side of the agricultural machine can be raised or lowered. Thus, the machine, when it moves transversely with respect to a slope, can be straightened.

EP 0 836 659 B1 discloses a chassis of a road-building machine, said chassis having a frame carried on two front wheels and two rear wheels. The front wheels of the known chassis are suspended such that they can follow changes in the transverse inclination of the road topping contradirectionally and to the same extent. In order to couple the two front wheels in such a way that these move contradirectionally and to the same extent, the guides of the two front wheels are connected to one another via a corresponding mechanical or hydraulic coupling device. This arrangement, which is often used in the prior art, is also designated as a floating axle.

The road-milling machine described in EP 0 940 274 A2 likewise has two front wheels which are adjustable in height contradirectionally and by equal amounts. On account of the positive coupling of the front wheels, the known chassis can react to elevations or depressions on one side of the road, in that one front wheel is lowered or raised, while the other front wheel executes a contradirectional movement. If, for example, there is an elevation of height a on one side, the corresponding front wheel is raised in relation to the machine by a/2, while the other front wheel is lowered in relation to the chassis by a/2. Thus, overall, the machine is raised by only a/2, thus improving the handiness of the machine and increasing its driving comfort.

In the prior art described above, there is the disadvantage that it is not possible to mount both the front wheels and the rear wheels floatingly, with positive coupling, in the way described, since this would lead to an unstable position of the machine.

When the machine is traveling along and is moving along a straight path, any obstacle in the form of an elevation or depression on one side of the machine is driven over not only by the floatingly mounted front axle, but also by the nonfloatingly mounted rear axle. In the region of the nonfloatingly mounted wheels, the obstacle then acts to its full extent on the vehicle frame. This is detrimental to the stability of these machines. Moreover, where a road-milling machine is concerned, the milling result is also impaired.

The object on which the present invention is based is, therefore, to improve the stability of the road-building machines initially mentioned, as compared with the prior art mentioned.

Furthermore, the object on which the present invention is based is to improve the compensation both of transverse inclinations of the road-building machines initially mentioned, which occur when obstacles are driven over and adversely influence the milling pattern of these road-building machines, and of unevenness in the longitudinal direction of these road-building machines.

This object is achieved, according to the invention, by means of the features specified in patent claim 1. Advantageous embodiments of the invention are the subject matter of the subclaims.

The road-building machine according to the invention has a left front wheel or caterpillar, a right front wheel or caterpillar, a left rear wheel or caterpillar and a right rear wheel or caterpillar. When a front wheel is referred to hereinafter, this is also understood to mean a caterpillar. Each of said wheels is assigned in each case an actuating member, with the aid of which the respective wheel is connected to the chassis of the road-building machine and can be adjusted in height in relation to the frame or chassis of the road-building machine. The frame can thereby be adjusted in height and oriented in relation to the ground. In this context, a height adjustment of the wheels is simply referred to hereafter. According to the invention, the actuating members are connected rigidly to the chassis of the road-building machine and are positively coupled to one another. The positive coupling is in this case designed such that the left front wheel and the right rear wheel are adjusted in height in the opposite direction to the right front wheel and the left rear wheel, the left front wheel and the right rear wheel being adjusted in height in the same direction.

The road-building machine according to the invention is to be understood as meaning, in particular, a road-milling machine, a recycler or a stabilizer. Road-building machines of this type are known to a person skilled in the art, and therefore a general description of these road-building machines in terms of their construction and functioning is dispensed with hereafter.

If all the actuating members are designed identically, for example if cylinders having identical cross sections are provided as actuating members, the height adjustment takes place essentially by equal amounts on all the wheels. This is to be understood as meaning that the amounts may only theoretically be exactly equal, that is to say on the precondition that, for example, the machine frame is infinitely rigid, the contact area is totally inflexible and the oil is fully incompressible. In practice, however, minor deviations cannot be avoided. It is also possible, however, to design the actuating members differently, for example to provide cylinders having different diameters, with the result that the tilting behavior of the machine can be influenced correspondingly.

The positive coupling according to the invention ensures that the road-building machine according to the invention has high stability, this being particularly important in a road-building machine having a narrow track. On account of the required transport dimensions, the track is generally relatively narrow. The road-building machine according to the invention puts into practice virtually a floating mount of both the front axle and the rear axle, with the result that stability is decisively improved. The building machine is therefore capable of driving safely over surfaces with a relatively high inclination, without the risk of the machine overturning. Furthermore, the permissible height of an obstacle which can be driven over by only one wheel of the machine is doubled, as compared with the prior art. In this case, a permissible height of an obstacle is to be understood as meaning the height which can be compensated by the raising or lowering of all the wheels of the building machine just such that all the wheels stand on the road, without, in the case of one of the wheels, the point being reached at which the wheel has completely run out or run in, that is to say the machine is "blocked".

Basically, the actuating members may be designed, as desired, as long as they allow a raising or lowering of the wheels. In a particularly preferred embodiment of the road-building machine according to the invention, however, the actuating members are designed as working cylinders, since these have proved to be particularly useful, in contrast to other solutions.

In a further preferred embodiment of the road-building machine according to the invention, the working cylinders are double-acting working cylinders with a first and a second working chamber which are filled with a pressure medium, the working cylinders being connected to one another by coupling lines. A pressure medium which may be considered is, for example, a hydraulic oil.

According to an advantageous embodiment of the road-building machine according to the invention, the working cylinders are arranged in such a way that the filling of the first working chamber or the emptying of the second working chamber causes a lowering of the wheel, while the filling of the second working chamber or the emptying of the first working chamber causes a raising of the wheel in relation to the frame.

In a further preferred embodiment of the road-building machine according to the invention, a first working cylinder is provided for the height adjustment of the left front wheel, a second working cylinder is provided for the height adjustment of the right front wheel, a third working cylinder is provided for the height adjustment of the left rear wheel and a fourth working cylinder is provided for the height adjustment of the right rear wheel.

In order to afford particularly simple positive coupling according to the invention, in a particularly preferred embodiment of the road-building machine according to the invention the first working chamber of the first working cylinder is connected to the first working chamber of the second working cylinder, the second working chamber of the second working cylinder is connected to the second working chamber of the fourth working cylinder, the first working chamber of the fourth working cylinder is connected to the first working chamber of the third working cylinder and the second working chamber of the third working cylinder is connected to the second working chamber of the first working cylinder via coupling lines.

However, since the positive coupling can also be implemented by connecting the other working chambers in each case, in a further advantageous embodiment of the road-building machine according to the invention the second working chamber of the first working cylinder is connected to the second working chamber of the second working cylinder, the first working chamber of the second working cylinder is connected to the first working chamber of the fourth working cylinder, the second working chamber of the fourth working cylinder is connected to the second working chamber of the third working cylinder and the first working chamber of the third working cylinder is connected to the first working chamber of the first working cylinder via coupling lines.

In a further advantageous embodiment of the road-building machine according to the invention, the first and the second working cylinder are connected to one another via a first coupling line, the second and the fourth working cylinder are connected to one another via a second coupling line, the fourth and the third working cylinder are connected to one another via a third coupling line and the third and the first working cylinder are connected to one another via a fourth coupling line.

In a particularly preferred embodiment of the road-building machine according to the invention, the working cylinders form, together with the coupling lines, a closed system. This, however, does not rule out the possibility of other hydraulic components being connected in another operating mode of the chassis.

In a particularly preferred embodiment of the road-building machine according to the invention, therefore, the coupling lines can be connected to a pressure medium source and/or a pressure medium sump via working lines with the aid of a valve control, if appropriate with the positive coupling being briefly canceled. As a result, further settings on the front or rear wheels can be carried out independently of the positive coupling according to the invention, thus making it possible to use the chassis on terrains of the most diverse possible form. It is therefore possible, for example, to orient the road-building machine according to the invention horizontally, even though it is standing on ground with a transverse inclination, in order at the same time to level out this ground by machining.

A pressure medium source may be understood as meaning, for example, an oil pump, in which case the pressure medium sump may be formed by discharged oil within a collecting container.

In a further advantageous embodiment of the road-building machine according to the invention, the valve control is designed such that all the wheels are raised in a first operating mode and are lowered in a second operating mode, this taking place in each case by the same amount.

In a further particularly advantageous embodiment of the road-building machine according to the invention, the valve control is designed such that each individual wheel can be raised in a first operating mode of the valve control and can be lowered in a second operating mode of the valve control.

In a modification of the abovementioned embodiment of the road-building machine according to the invention, only one of the two front wheels is raised in a first operating mode and is lowered in a second operating mode. This means that the capability for the individual setting of the wheels relates to only the two front wheels.

According to a further advantageous embodiment of the road-building machine according to the invention, the valve control is designed such that, in a specific operating mode of the valve control, the left and the right front wheel or the left and the right rear wheel or the left rear wheel and front wheel or the right rear wheel and front wheel are adjusted in height in the same direction and by the same amount.

In a particularly advantageous embodiment of the road-building machine according to the invention, the valve control can be operated in an operating mode restoring the positive coupling. In this embodiment, this ensures that the user can also cancel the positive coupling, in order to carry out additional settings on the individual wheels, before he changes to the positive coupling mode again.

The invention is explained in more detail below by means of exemplary embodiments, with reference to the accompanying figures in which.

Figure 1:
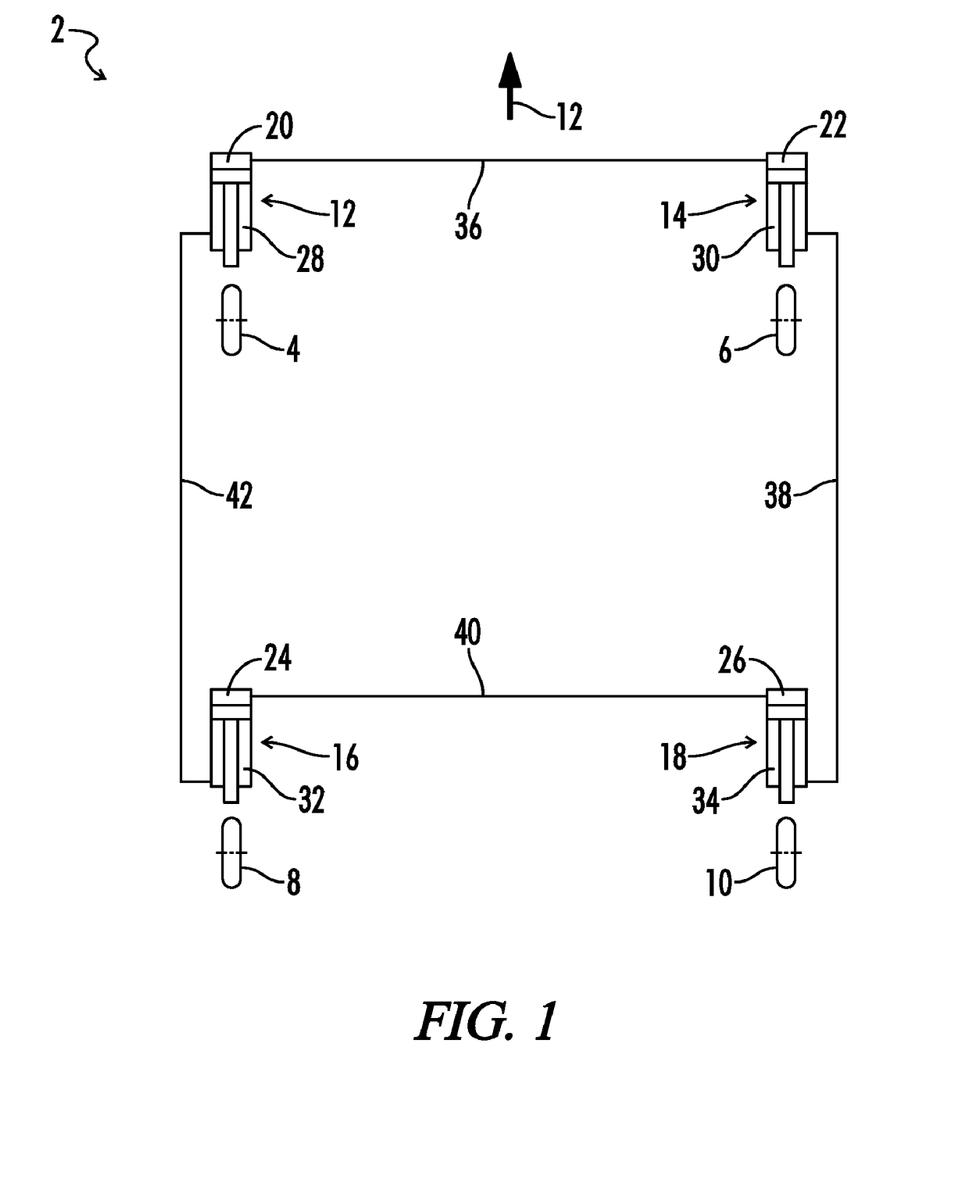
FIG. 1 shows a diagrammatic illustration of a first embodiment of the road-building machine according to the invention.

FIG. 1 shows a first embodiment of the road-building machine according to the invention which, in the form of the road-milling machine mentioned initially, has a milling roller W (FIG. 7) which is arranged between the front and the rear wheels of said machine. By contrast, the road-building machine according to the invention, in the form of the recycler or stabilizer mentioned initially, has a milling/mixing rotor W (FIG. 7) which is arranged between the front and the rear wheels of the road-building machine.

A milling roller of this type or a milling/mixing rotor of this type is known as such to a person skilled in the art, and therefore an exact description of the milling roller or of the milling/mixing rotor is dispensed with this at this juncture.

The road-building machine according to the invention has a left front wheel 4, a right front wheel 6, a left rear wheel 8 and a right rear wheel 10 which are merely indicated in FIG. 1. The wheels 4, 6, 8, 10 allow a movement of the chassis in the driving direction which is indicated in FIG. 1 by the arrow 12. Each wheel 4, 6, 8, 10 is assigned an actuating member which allows the height adjustment of the respective wheel 4, 6, 8, 10. The illustration of the connection between the actuating member and the individual wheel has been dispensed with for the sake of clarity. Here, for example, a guide device may be provided which is connected to the actuating member and on the end of which the corresponding wheel 4, 6, 8, 10 is suspended via a bracket.

In the embodiment illustrated, the actuating members are designed as working cylinders, all the working cylinders being identical in terms of their construction and their dimensions in the exemplary embodiment. Thus, the left front wheel 4 is assigned a first working cylinder 12, the right front wheel 6 is assigned a second working cylinder 14, the left rear wheel 8 is assigned a third working cylinder 16 and the right rear wheel is assigned a fourth working cylinder 18. However, an arrangement of working cylinders of different piston diameters is also possible. The characteristic of the road-building machine can be influenced by different cylinders being arranged on the front axle and the rear axle.

The working cylinders 12, 14, 16, 18 are designed as double-acting working cylinders, so that the working cylinders 12, 14, 16, 18 have in each case a piston-side first working chamber 20, 22, 24, 26 and a piston rod-side second working chamber 28, 30, 32, 34, which are separated from one another by pistons located in the cylinder. The first and the second working chambers 20, 22, 24, 26, 28, 30, 32, 34 are filled with a pressure medium which in the present case is a hydraulic oil. What is applicable to all the working cylinders 12, 14, 16, 18 is that a filling of the first working chamber 20, 22, 24, 26 or an emptying of the second working chamber 28, 30, 32, 34 causes a lowering of the associated wheel 4, 6, 8, 10, while the filling of the second working chamber 28, 30, 32, 34 or the emptying of the first working chamber 20, 22, 24, 26 causes a raising of the wheel 4, 6, 8, 10.

The working cylinders 12, 14, 16, 18 are connected to one another via coupling lines. Thus, the first and the second working cylinder 12 and 14 are connected to one another via a first coupling line 36, the second and the fourth working cylinder 14 and 18 are connected to one another via a second coupling line 38, the fourth and the third working cylinder 18 and 16 are connected to one another via a third coupling line 40 and the third and the first working cylinder 16 and 12 are connected to one another via a fourth coupling line 42.

The first coupling line 36 connects the first working chamber 20 of the first working cylinder 12 to the first working chamber 22 of the second working cylinder 14. The second coupling line 38 connects the second working chamber 30 of the second working cylinder 14 to the second working chamber 34 of the fourth working cylinder 18. The third coupling line 40 connects the first working chamber 26 of the fourth working cylinder 18 to the first working chamber 24 of the third working cylinder 16. The fourth coupling line 42 connects the second working chamber 32 of the third working cylinder 16 to the second working chamber 28 of the first working cylinder 12. The working cylinders 12, 14, 16, 18 form, together with the coupling lines 36, 38, 40, 42, a closed system.

The functioning of the road-building machine according to the invention from FIG. 1 is described below. When the road-building machine according to the invention drives, for example with the left front wheel 4 of the chassis 2, over an obstacle of, for example, a height of 400 mm, the piston in the first working cylinder 12 is retracted by 100 mm on account of the weight of the vehicle. The pressure medium is thus pressed out of the first working chamber 20 of the first working cylinder 12 via the first coupling line 36 into the first working chamber 22 of the second working cylinder 14. In this case, the pressure medium is pressed out of the second working chamber 32 of the third working cylinder 16 via the fourth coupling line 42 into the second working chamber 28 of the first working cylinder 12. On account of the positive coupling, the pistons in the second and the third working cylinder 14, 16 are moved in the opposite direction to the piston of the first working cylinder 12 and by the same amount, that is to say 100 mm. Since the second and the third working cylinder 14, 16, in turn, are connected to the fourth working cylinder 18 via the second and the third coupling line 38, 40 in the way described above, this has the effect that the piston in the fourth working cylinder 18 is moved in the same direction and by the same amount as the piston of the first working cylinder 12. Thus, the left front wheel 4 and the right rear wheel 10 are adjusted in height in the opposite direction to the right front wheel 6 and the left rear wheel 8, the left front wheel 4 and the right rear wheel 10 being adjusted in height in the same direction, and the height adjustment taking place by equal amounts on all the wheels 4, 6, 8, 10. It may be noted that the pistons of the cylinders are moved by only 100 mm, while the height of the obstacle is 400 mm, with the result that the driving comfort and stability are improved. In this case, the overall level of the road-building machine is raised by 100 mm in this exemplary embodiment.

Further embodiments of the road-building machine according to the invention are described below with reference to FIGS. 2 to 4 and all have the same basic structure and functioning as were described with reference to FIG. 1, and therefore identical parts are given the same reference symbols and the above description applies correspondingly. For this reason, only the additional features of the further embodiments are dealt with below.

Figure 2:
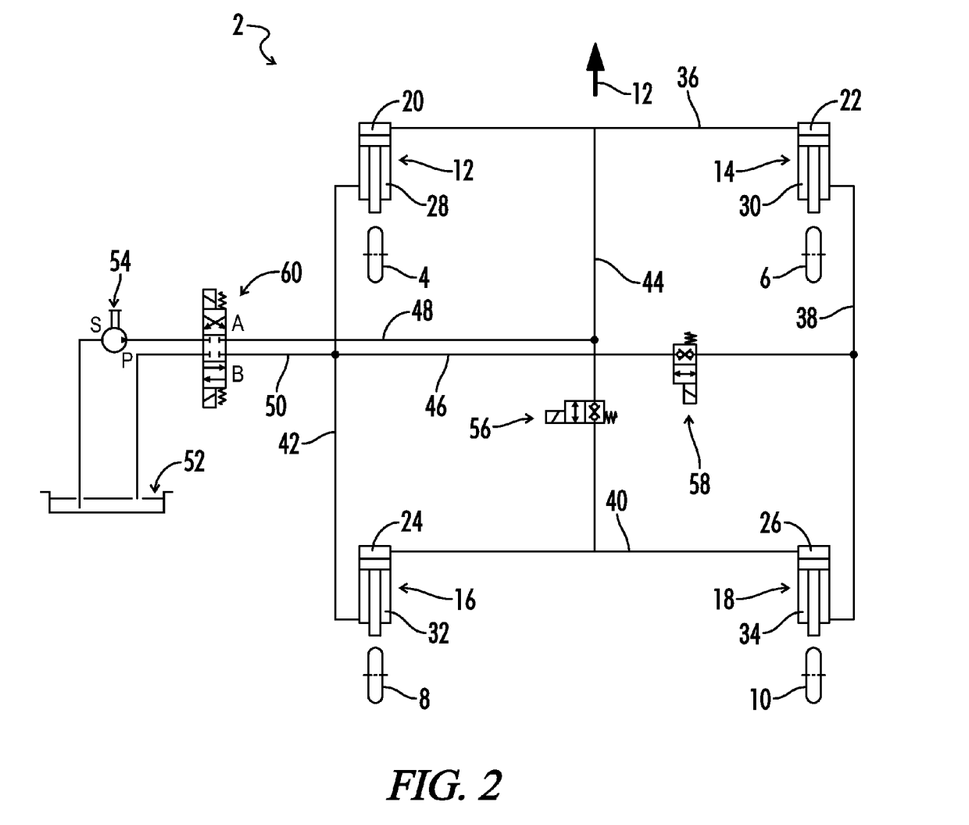
FIG. 2 shows a diagrammatic illustration of a second embodiment of the road-building machine according to the invention.

In the second embodiment shown in FIG. 2, the first coupling line 36 is connected to the third coupling line 40 via a first connecting line 44. Furthermore, the second coupling line 38 is connected to the fourth coupling line 42 via a second connecting line 46. Moreover, a first working line 48 is provided, which is connected to the first connecting line 44, and a second working line 50 is provided, which is connected to the second connecting line 46. The first and the second working line 48, 50 issue into a pressure medium sump, a pressure medium source 54 in the form of an oil pump being provided, furthermore, in the first working line 48.

The second embodiment has, furthermore, a valve control which comprises a first directional valve 56 in the first connecting line 44, a second directional valve 58 in the second connecting line 46 and a third directional valve 60 in the working lines 48, 50. When the third directional valve 60 is brought into the position a, while the first and the second directional valve 56, 58 are opened, pressure medium flows from the pressure medium source 54 via the corresponding lines into the second working chamber 28, 30, 32, 34 of the working cylinders 12, 14, 16, 18. In reaction, the pressure medium is pressed out of the first working chamber 20, 22, 24, 26 of the working cylinders 12, 14, 16, 18 and is discharged via the corresponding lines into the pressure medium sump 52. In this first operating mode, the positive coupling described above is consequently canceled briefly, and the wheels 4, 6, 8, 10 are raised by equal amounts. In a second operating mode, in which the third directional valve 60 assumes the position B, while the first and the second directional valve 56, 58 are opened, conversely, a lowering of the wheels 4, 6, 8, 10 by equal amounts takes place. As a result of the closing of the first, the second and the third directional valve 56, 58, 60, as illustrated in FIG. 2, the valve control can be brought again into an operating mode in which the positive coupling described above is restored.

The directional valves are preferably electromechanically actuated valves. The devices required for actuating the valves are generally known to a person skilled in the art. Preferably, the valves are spring-prestressed, so that, after the height correction of the building machine, they assume their initial position again as soon as they are no longer activated. The road-building machine then behaves in the same way as in the first exemplary embodiment.

Figure 3:
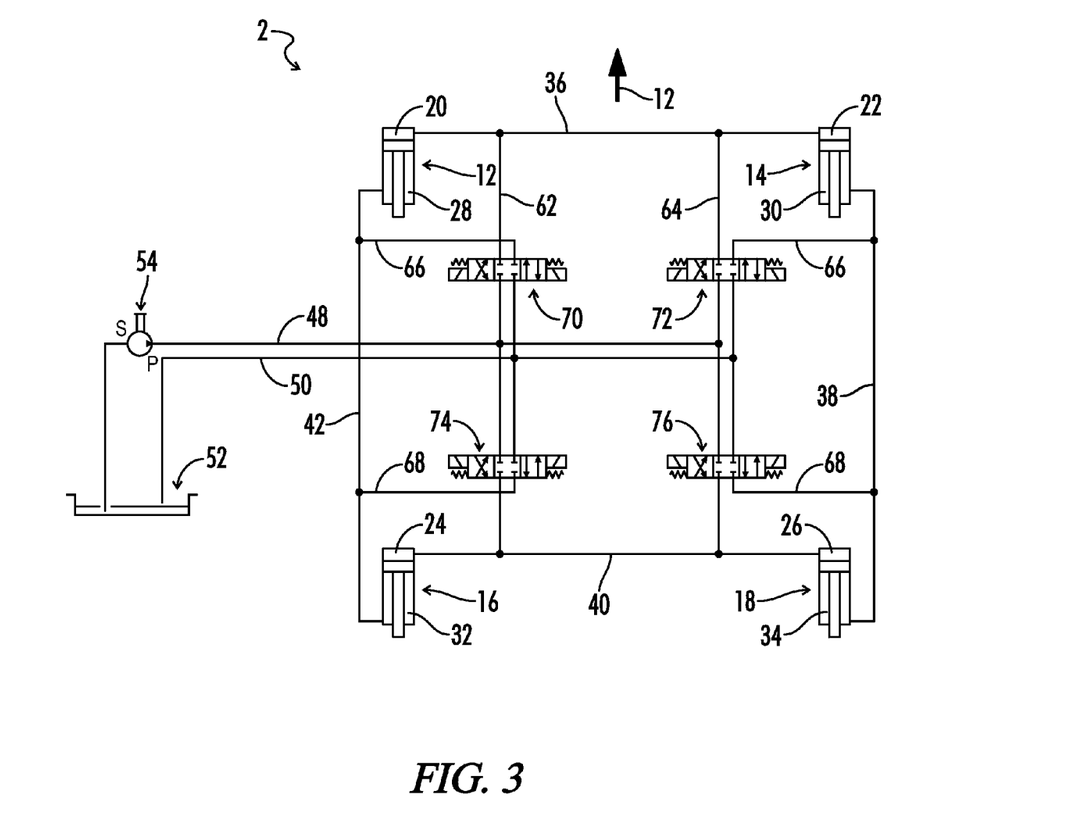
FIG. 3 shows a diagrammatic illustration of a third embodiment of the road-building machine according to the invention.

FIG. 3 shows a third embodiment of the road-building machine according to the invention, the third embodiment resembling the second and the first embodiment, and therefore the same reference symbols are used hereafter for identical parts, the preceding description applying correspondingly and only the differences from the embodiments described above being dealt with below. This embodiment allows the individual activation of all the wheels, so that it is possible to predetermine exactly a basic setting both for the transverse and for the longitudinal inclination of the building machine.

In the third embodiment shown in FIG. 3, the first coupling line 36 is connected to the third coupling line 40 via a first and a second connecting line 62, 64 which, in turn, are connected to the working line 48. Furthermore, the second coupling line 38 is connected to the fourth coupling line 42 via a third and a fourth connecting line 66, 68 which, in turn, are connected to the working line 50. The connecting lines 62, 64, 66, 68 issue at one end, in each case in the vicinity, preferably in the immediate vicinity of the respective working cylinder 12, 14, 16, 18, into the corresponding coupling line 36, 38, 40, 42. In contrast to the second embodiment, here, in each case a directional valve 70, 72, 74, 76 which corresponds to the third directional valve 60 of the second embodiment is provided in the connecting lines 62, 64, 66, 68 in a way in which it is assigned to the respective working cylinder 12, 14, 16, 18. Thus, the individual working cylinders 12, 14, 16, 18 can be actuated in such a way that individual wheels 4, 6, 8, 10 can independently of one another be raised in a first operating mode of the valve control and be lowered in a second operating mode.

As a function of the activation of the individual directional valves 70, 72, 74, 76, oil is supplied to the piston rod-side working chamber or piston-side working chamber of the cylinder 12, 14, 16, 18 assigned in each case to the directional valve and is correspondingly discharged from the other side, so that the piston is retracted or extended, with the result that the building machine is raised or lowered at the respective corner. In this case, the pressurized oil always follows the path of least resistance. Even if part of the oil were to follow the path via all the other cylinders, instead of via the cylinder which is assigned to the activated directional valve, the effects on the other cylinders are minor. This is because the pistons of the directly adjacent cylinders move in the same direction by the corresponding amount, while the piston of the diagonally opposite cylinder moves in the opposite direction exactly by this proportionate amount. If the piston of the cylinder 12 at front left is to be raised, for example, by 200 mm, and assuming that 10% of the oil quantity required for this purpose flows into the cylinder 14 at front right, the piston of the cylinder 12 at front left is thereby retracted only by 180 mm, instead of by the expected 200 mm, the piston at front right and the piston at rear left are likewise retracted by 20 mm and the piston at rear right is extended by 20 mm. Consequently, the left corner of the building machine is not lowered by the expected 200 mm, but only by 180 mm. Moreover, however, the "misconducted" oil causes a reverse movement in the diagonally opposite corner, that is to say "only 180 mm", at front left, but, instead, 20 mm in the opposite direction at rear right. The operator can then actuate the operating mode until the desired amount, for example 200 mm, is reached. The same applies to the raising or lowering of the other corners of the building machine. For this purpose, in particular, it is critical that the respective connecting lines 62, 64, 66, 68 issue at one end, in each case in the vicinity of the assigned working cylinder 12, 14, 16, 18, into the corresponding coupling line 36, 38, 40, 42.

Figure 4:
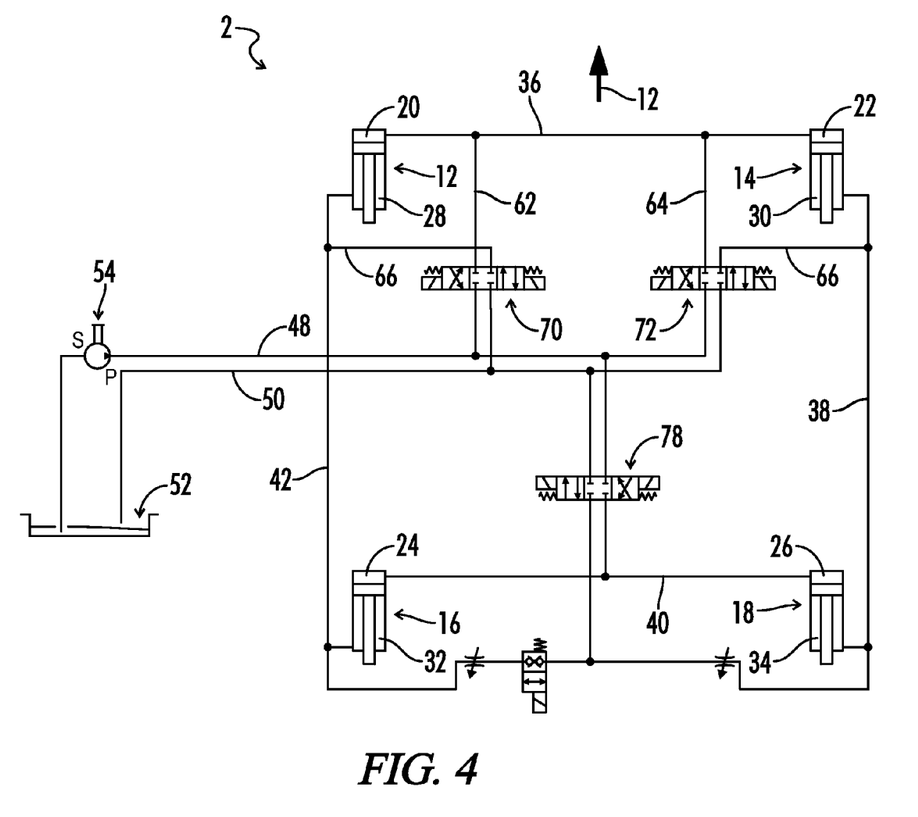
FIG. 4 shows a diagrammatic illustration of a fourth embodiment of the road-building machine according to the invention.

FIG. 4 shows a fourth embodiment of the road-building machine according to the invention, the fourth embodiment resembling the third, the second and the first embodiment, and therefore the same reference symbols are used hereafter for identical parts, the preceding description applying correspondingly and only the differences from the embodiments described above being dealt with below. In this embodiment, only the two front wheels can be set individually in height. In contrast to the third embodiment, instead of the two directional valves 74, 76, only one directional valve 78 is used, which is assigned equally to the two working cylinders 16 and 18. Thus, in the fourth embodiment, the two rear wheels 8, 10 are only jointly adjustable in height by means of a corresponding setting of the directional valve 78, while the two front wheels 4, 6 continue to be individually adjustable in height.

Figure 5:
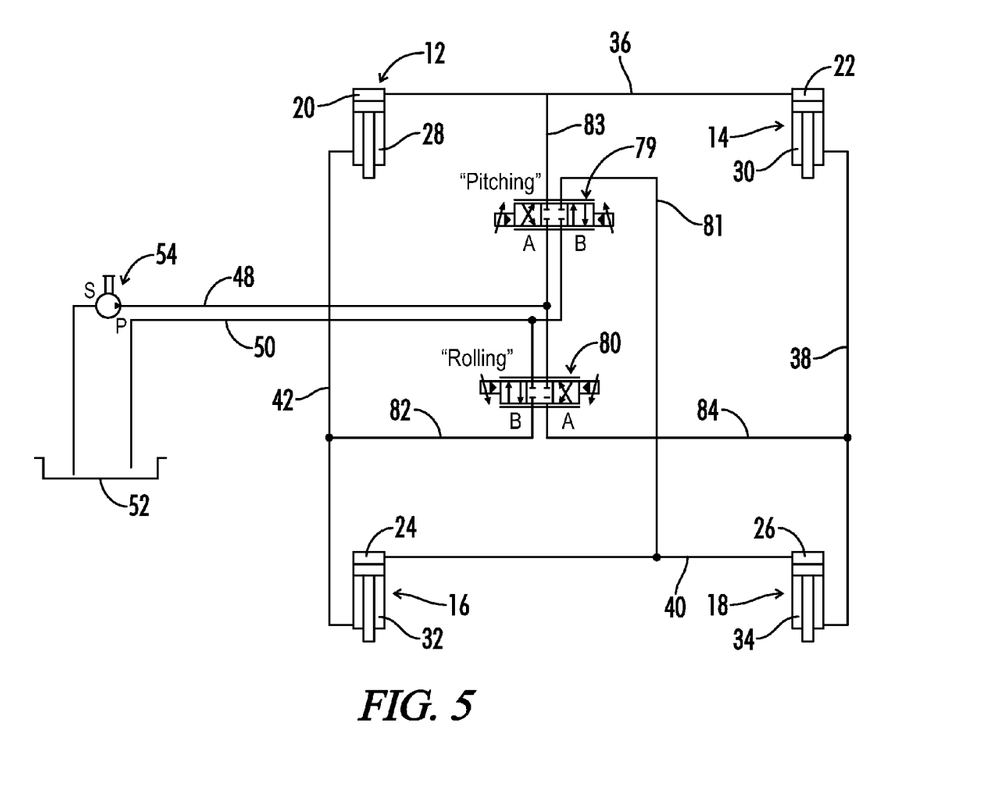
FIG. 5 shows a diagrammatic illustration of a fifth embodiment of the road-building machine according to the invention.

FIG. 5 shows a diagrammatical illustration of a fourth embodiment of the road-building machine according to the invention, the same reference symbols being used again for identical parts. This exemplary embodiment of the chassis allows either a "pitching" or a "rolling" of the machine. In the "pitching" of the machine, both front wheels 4, 6 are raised or lowered, while both rear wheels 8, 10 are lowered or raised by the same amount in the opposite direction. The transverse inclination of the machine in this case remains unchanged. If, for example, the mechanically driven milling roller W (FIG. 7) or the mechanically driven milling and mixing rotor W (FIG. 7) is ideally arranged in the middle of the road-building machine, the latter can be inclined forward or rearward, without the milling depth being influenced. In rolling, the front and the rear left wheel 4, 8 are raised or lowered, while the front and the rear right wheel 6, 10 are lowered or raised by the same amount.

The hydraulic circuit has a valve control which comprises a first directional valve 79 and a second directional valve 80.

When the first directional valve 79 is brought into the position A, the pressure medium source 54 conveys pressure medium, for example oil, via the first working line 48 and a first connecting line 81 to the third coupling line 40, while oil flows out from the first coupling line 36 via a second connecting line 83 and the second working line 50 into the pressure medium sump 54. When the second directional valve 80 is brought into the position A, the pressure medium source 54 conveys pressure medium, for example oil, via the first working line 48 and a third connecting line 82 to the fourth coupling line 42, while oil flows out from the second coupling line 38 via a fourth connecting line 48 and the second working line 50 into the pressure medium sump 54.

When, by contrast, the first or the second directional valve 79 is brought into the position B, the oil pump 54 conveys oil via the first working line 48 and the second connecting line 83 to the first coupling line 38 or by the first working line 48 and the fourth connecting line 84 to the second coupling line 38, while oil flows out from the third coupling line 40 via the first connecting line 81 and the second working line 50 or from the fourth coupling line 42 via the second connecting line 82 and the second working line 50 into the pressure medium sump 54.

Consequently, in the position A of the first directional valve 79, the first working chamber 24 of the third cylinder 16 and the first working chamber 26 of the fourth cylinder 18 and the second working chamber 28 of the first cylinder 12 and the second working chamber 30 of the second cylinder 14 are acted upon with oil, while oil flows out from other working chambers of the cylinders, so that the front wheels 4, 6 are run in and the rear wheels 8, 10 are run out. By contrast, in the position B of the first directional valve 79, the front wheels 4, 6 are run out and the rear wheels 8, 10 are run in. The machine therefore "pitches".

In the position A of the second directional valve 80, the second working chamber 28 of the first cylinder 12 and the second working chamber 32 of the third cylinder 16 are acted upon with oil, while oil flows out from the second working chamber 30 of the second cylinder 14 and the second working chamber 34 of the fourth cylinder 18, so that the left wheels 4, 8 are run in and the right wheels 6, 10 are run out. By contrast, in the position B of the second directional valve 80, the second working chamber 30 of the second cylinder 14 and the second working chamber 34 of the fourth cylinder 18 are acted upon with oil, while oil flows out from the other working chambers, so that the right wheels 6, 10 are run in and the left wheels 4, 8 are run out. The machine therefore "rolls" about its longitudinal axis.

Figure 6A:
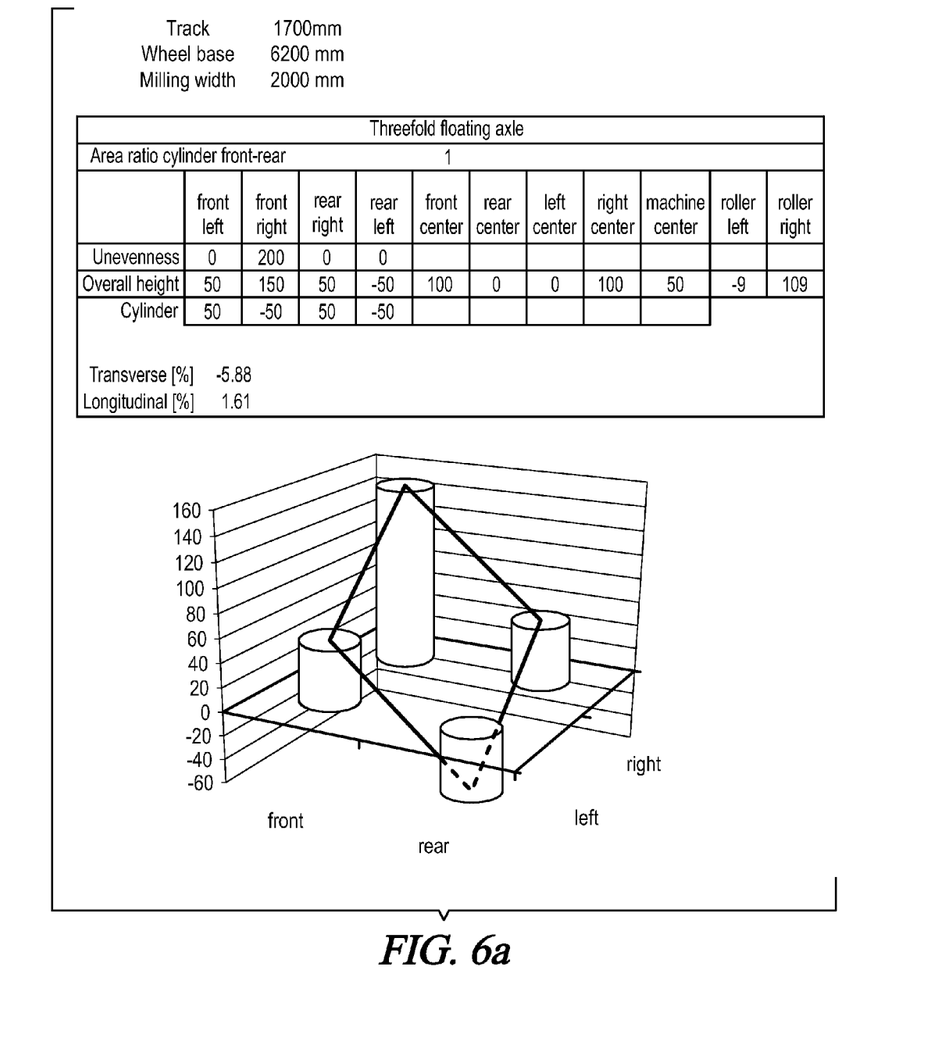
FIG. 6a, 6b, 6c show the driving behavior of the road-building machine according to the invention in comparison with the prior art.
Figure 6B:
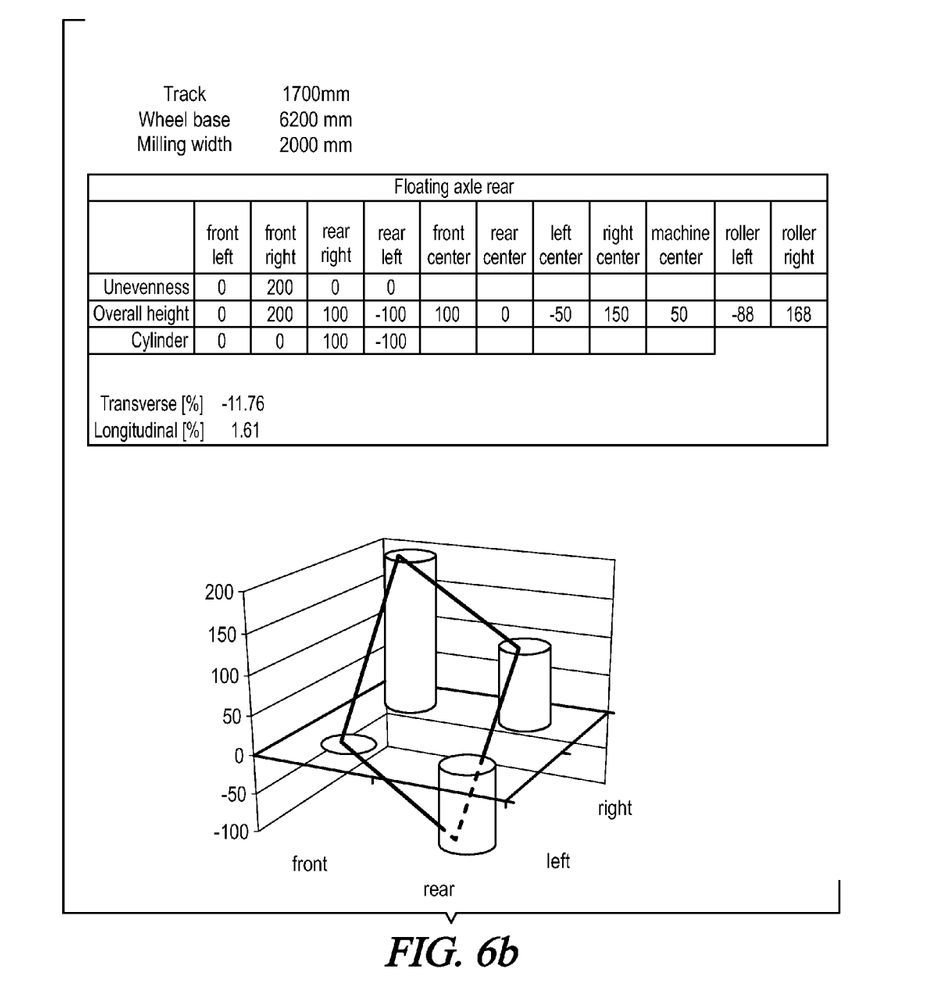
Figure 6C:
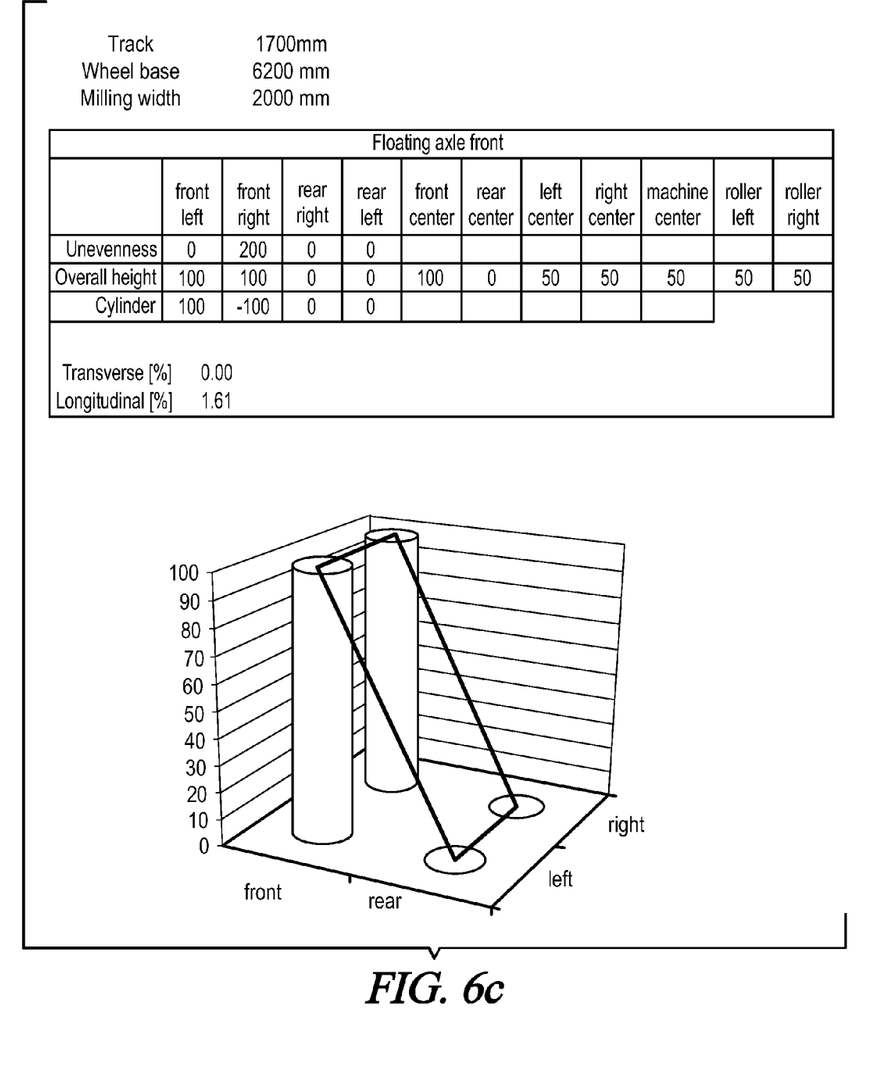

FIGS. 6a, 6b and 6c show, in each case in the form of a table and in an associated diagram, the raising and lowering, simulated by a computer program, of the pistons of the individual cylinders 12, 14, 16, 18, that is to say of the wheels 4, 6, 8, 10, of road-milling machines having a different chassis with a track of 1700 mm, a wheel base of 6200 mm and a milling width of 2000 mm, when the machine drives over an unevenness at front left with a height of 200 mm.

The table and the bar chart of FIG. 6a indicate the overall height, the height of the machine center, the height of the left and the right milling roller side and the stroke of the pistons of the individual cylinders of the road-milling machine according to the invention when it drives over the obstacle, while FIG. 6b indicates the corresponding values for a known road-milling machine with a floating axle at the rear and a rigid axle at the front, and FIG. 6c indicates the corresponding values for a known road-milling machine with a floating axle at the front and a rigid axle at the rear.

The hydraulic circuits described may also comprise additional components, for example accumulators, throttles and the like, which, however, are not absolutely necessary for the basic functions of the circuit.

The tables and diagrams show clearly that the transverse inclination of the road-milling machine according to the invention (FIG. 6a) when it drives over the obstacle is markedly lower at 5.88% than the transverse inclination of the machine with the floating axle at the rear according to the prior art (FIG. 6b), the transverse inclination of which is 11.76%. Although the transverse inclination of the machine with a floating axle at the front according to the prior art (FIG. 6c) is 0% when it drives over an obstacle at front left, when it drives over another obstacle the advantage referred to nevertheless arises again. Overall, in the road-milling machine according to the invention, the inclination is therefore, on average, lower than in the known machines in the case of various obstacles.

Figure 7:
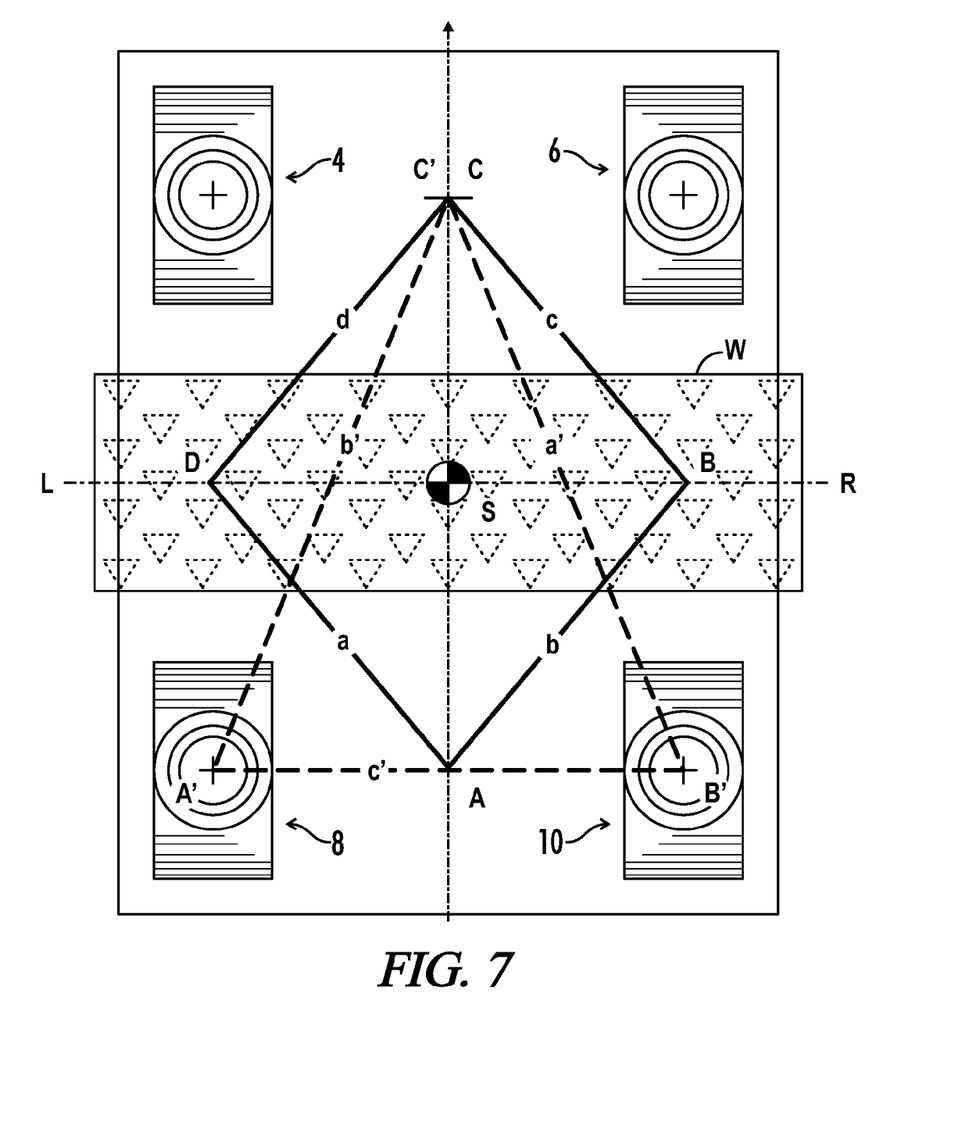
FIG. 7 shows a diagrammatic illustration of the road-building machine according to the invention to make clear its stability.

FIG. 7 shows the chassis in a diagrammatic illustration to make clear the stability of the machine in comparison with the prior art.

The machine has a left front wheel 4 and a right front wheel 6 and also a left rear wheel 8 and a right rear wheel 10. The driving direction of the machine is identified by an arrow. Furthermore, the machine has a milling roller W or a milling/mixing rotor W which is arranged centrally between the front and the rear wheels. The center of gravity of the machine is designated by "S".

In the exemplary embodiment according to FIG. 5, "pitching" corresponds to a tilting or pivoting about the axis L-R and "rolling" corresponds to a tilting or pivoting about the axis C-A.

The stability of a conventional machine, which has a floating axle at the front and a rigid axle at the rear, is described first. The stability of the conventional machine is described by a stability triangle with the corner points A', B', C'. The machine is stable as long as its center of gravity lies within the stability triangle A', B', C'. If the center of gravity lies on one of the lines A', B', C', the machine is in a metastable state. If, by contrast, the center of gravity lies outside the stability triangle A', B', C', the machine is unstable and tilts about the axis a' or b' or c' of the stability triangle which lies nearest to the center of gravity S.

In the operation of the floating axle, when only one of two front wheels 4, 6 drives over an obstacle, the respective corner of the machine is not raised, but, instead, the entire front part of the machine. If the left or the right front wheel drives over the obstacle, the front wheel of the machine is raised by half the overall height of the obstacle, that is to say the machine behaves as though the point C' is raised by half the height of the obstacle, the point C' in this case tilting or pivoting about the axis c' which is the base of the stability triangle A', B', C'. If the machine drives further on, the obstacle comes under the left or the right rear wheel 8, 10, for example the right rear wheel 10. Since the rear axle is a rigid axle, the rear right corner is raised by the amount of the overall height of the obstacle. However, the position of the left rear side of the machine in this case remains unchanged. The machine tilts or pivots about the axis b', that is to say the front axle assumes the same transverse inclination as the rear axle, the point C' remaining unchanged in height, so that the front wheels 4, 6 run in or out by correspondingly equal amounts, but in the opposite direction, in order to eliminate this fault. Since the axes a' and b' of the stability triangle A', B', C' run relatively steeply with respect to the axis L-R of the roller W, the milling pattern is thereby adversely influenced.

The floating about the longitudinal axis C-A of the machine has the greatest adverse influence on the height of the left and the right cutting edge L, R of the milling roller W, whereas floating about the roller axis L-R has no influence at all on the milling depth.

In comparison with the prior art, the stability of a road-building machine according to the invention is not described by a stability triangle, but, instead, by a stability lozenge A, B, C, D.

If, for example, the right front wheel 6 drives onto an obstacle, the machine tilts or pivots about the axis a, the same applying similarly to the other wheels. The same also applies correspondingly to the situation where the individual wheels are raised or lowered as a result of the actuation of the directional valves in the exemplary embodiment described with reference to FIG. 3.

FIG. 7 clearly shows the improved stability of the road-building machine according to the invention, as compared with a conventional machine, by the stability lozenge in comparison with the stability triangle. The distance of the center of gravity S from all sides of the stability lozenge A, B, C, D is markedly greater than the distance of the center of gravity from any side of the stability triangle A', B', C'. For example, the distance of the center of gravity S from one of the points D or B of the lozenge A, B, C, D is exactly twice as great as the distance of the center of gravity S from the point of intersection of the axis L-R with one of the sides a' or b' of the triangle A', B', C'.

What is claimed is:

1. A method of operating a road-building machine, comprising:
   (a) providing a road-building machine including:
      a chassis having a forward direction;
      a left front ground engaging support;
      a right front ground engaging support;
      a left rear ground engaging support;
      a right rear ground engaging support;
      a first working cylinder rigidly connected to the chassis and connected to the left front ground engaging support for adjusting a height of the left front ground engaging support relative to the chassis;
      a second working cylinder rigidly connected to the chassis and connected to the right front ground engaging support for adjusting a height of the right front ground engaging support relative to the chassis;
      a third working cylinder rigidly connected to the chassis and connected to the left rear ground engaging support for adjusting a height of the left rear ground engaging support relative to the chassis;
      a fourth working cylinder rigidly connected to the chassis and connected to the right rear ground engaging support for adjusting a height of the right rear ground engaging support relative to the chassis;
      a rotating working drum supported from the chassis between the front ground engaging supports and the rear ground engaging supports and extending transversely to the forward direction;
      each of the working cylinders including at least one working chamber filled with a pressure medium; and
      coupling lines connecting the working cylinders to one another and providing a positive hydraulic coupling between the working cylinders;
   (b) adjusting the height of the left front and right rear ground engaging supports in a first direction; and
   (c) adjusting the height of the right front and left rear ground engaging supports in a second direction opposite the first direction.

2. The method of claim 1, wherein in step (a) each of the working cylinders is a double acting working cylinder including first and second working chambers.

3. The method of claim 1, wherein in step (a) the rigidly connected working cylinders extend vertically when the chassis is oriented horizontally, and the first and second directions are vertical.

4. The method of claim 1, wherein in step (a) the machine has a four sided stability pattern having a widest transverse dimension, transverse to the forward direction of the chassis, which widest transverse dimension falls within a footprint of the working drum.

5. The method of claim 4, wherein in step (a) the widest transverse dimension of the stability pattern substantially intersects a center-of-gravity of the machine.

6. The method of claim 4, wherein in step (a) the widest transverse dimension of the stability pattern intersects a rotational axis of the working drum.

7. The method of claim 4, wherein in step (a) the stability pattern is diamond shaped having a longest diagonal extending parallel to the forward direction of the chassis.

8. The method of claim 1, wherein in step (a) the working drum is arranged centrally between the front and rear ground engaging supports.

9. The method of claim 1 wherein in step (a) the working cylinders and coupling lines comprise a closed hydraulic system not including any accumulators for dynamic damping, so that a displacement of pressure medium from one of the chambers of the first working cylinder results in a displacement of pressure medium of substantially equal magnitude in the other working cylinders.

10. The method of claim 1, further comprising:
    temporarily cancelling the positive hydraulic coupling between the working cylinders; and
    subsequently restoring the positive hydraulic coupling.

11. The method of claim 10, further comprising:
    during the temporarily cancelling step, raising and/or lowering an individual one of the ground engaging supports.

12. The method of claim 10, further comprising:
    during the temporarily cancelling step, raising and/or lowering only one of the front ground engaging supports.

13. The method of claim 10, further comprising:
    during the temporarily cancelling step, raising all of the ground engaging supports by the same amount.

14. The method of claim 10, further comprising:
    during the temporarily cancelling step, lowering all of the ground engaging supports by the same amount.

15. The method of claim 10, further comprising:
during the temporarily cancelling step, adjusting in height in the same direction and by the same amount the left and the right front ground engaging supports.

16. The method of claim 10, further comprising:
during the temporarily cancelling step, adjusting in height in the same direction and by the same amount the left and the right rear ground engaging supports.

17. The method of claim 10, further comprising:
during the temporarily cancelling step, adjusting in height in the same direction and by the same amount the left front and left rear ground engaging supports.

18. The method of claim 10, further comprising:
during the temporarily cancelling step, adjusting in height in the same direction and by the same amount the right front and right rear ground engaging supports.

19. A method of operating a road-building machine, comprising:
(a) providing a road-building machine including:
a chassis having a forward direction;
a left front ground engaging support;
a right front ground engaging support;
a left rear ground engaging support;
a right rear ground engaging support;
a first working cylinder connected to the chassis and connected to the left front ground engaging support for adjusting a height of the left front ground engaging support relative to the chassis;
a second working cylinder connected to the chassis and connected to the right front ground engaging support for adjusting a height of the right front ground engaging support relative to the chassis;
a third working cylinder connected to the chassis and connected to the left rear ground engaging support for adjusting a height of the left rear ground engaging support relative to the chassis;
a fourth working cylinder connected to the chassis and connected to the right rear ground engaging support for adjusting a height of the right rear ground engaging support relative to the chassis;
the first, second, third and fourth working cylinders extending vertically when the chassis is oriented horizontally;
a rotating working drum supported from the chassis between the front ground engaging supports and the rear ground engaging supports and extending transversely to the forward direction;
each of the working cylinders including at least one working chamber filled with a pressure medium; and
coupling lines connecting the working cylinders to one another and providing a positive hydraulic coupling between the working cylinders;
(b) adjusting the height of the left front and right rear ground engaging supports in a first direction; and
(c) adjusting the height of the right front and left rear ground engaging supports in a second direction opposite the first direction, the first and second directions being vertical when the chassis is oriented horizontally.

20. The method of claim 19, further comprising:
temporarily cancelling the positive hydraulic coupling between the working cylinders; and
subsequently restoring the positive hydraulic coupling.

* * * * *

UNITED STATES PATENT AND TRADEMARK OFFICE
CERTIFICATE OF CORRECTION

| | | |
|---|---|---|
| PATENT NO. | : 8,118,316 B2 | |
| APPLICATION NO. | : 12/911301 | |
| DATED | : February 21, 2012 | |
| INVENTOR(S) | : Christian Berning et al. | |

It is certified that error appears in the above-identified patent and that said Letters Patent is hereby corrected as shown below:

Column 9, line 34, replace "48" with --84--.
Column 9, line 37, after "79" add --or 80--.
Column 9, line 39, replace "38" with --36--.

Signed and Sealed this
Seventeenth Day of April, 2012

David J. Kappos
*Director of the United States Patent and Trademark Office*